United States Patent
Uozumi (10) Patent No.: US 11,900,591 B2
(45) Date of Patent: Feb. 13, 2024

(54) DISPLACEMENT METER, STORAGE MEDIUM, MANUFACTURING SYSTEM, AND METHOD FOR MANUFACTURING ARTICLES

(71) Applicant: CANON KABUSHIKI KAISHA, Tokyo (JP)

(72) Inventor: Takayuki Uozumi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 71 days.

(21) Appl. No.: 17/720,763

(22) Filed: Apr. 14, 2022

(65) Prior Publication Data
US 2022/0343482 A1    Oct. 27, 2022

(30) Foreign Application Priority Data
Apr. 27, 2021    (JP) .................................. 2021-074766

(51) Int. Cl.
*G06T 7/60*    (2017.01)
*H04N 23/56*    (2023.01)
(Continued)

(52) U.S. Cl.
CPC ................ *G06T 7/001* (2013.01); *G01P 3/38* (2013.01); *G02B 13/22* (2013.01); *G06T 7/60* (2013.01);
(Continued)

(58) Field of Classification Search
None
See application file for complete search history.

(56) References Cited

U.S. PATENT DOCUMENTS

| 7,065,258 B2 | 6/2006 | Nahum | |
|---|---|---|---|
| 2002/0179819 A1* | 12/2002 | Nahum | G01B 11/02 |
| | | | 250/208.1 |
| 2017/0134659 A1* | 5/2017 | Miyahara | H04N 23/681 |

FOREIGN PATENT DOCUMENTS

| JP | S59-52963 B | 12/1984 |
|---|---|---|
| JP | H3-235007 A | 10/1991 |

(Continued)

OTHER PUBLICATIONS

Notice of Reasons for Refusal issued by the Japanese Patent Office dated Apr. 18, 2023 in corresponding JP Patent Application No. 2021-074766, with English translation.

*Primary Examiner* — Samuel D Fereja
(74) *Attorney, Agent, or Firm* — Carter, DeLuca & Farrell LLP (57) ABSTRACT

A displacement meter for suppressing errors occurring in sub-pixel estimation, comprising: alight source that illuminates an object; an image pickup unit for receiving diffused-reflected light from the object; and a calculation unit for calculating the a displacement amount of the object by using sub-pixel estimation and the cross-correlation function between reference image data and measurement image data, wherein an image acquired during a predetermined timing from the imaging unit serves as the reference image data and an image acquired during the next timing serves as the measurement image data, generates a correction displacement amount by subtracting a correction value from the displacement amount, sets the most recent measurement image data as the reference image data and sets a predetermined initial value as the correction value if the displacement amount meets a predetermined condition, and else sets the displacement amount obtained most recently as the correction value.

14 Claims, 7 Drawing Sheets

(51) Int. Cl.
*G06T 7/00* (2017.01)
*G06V 10/75* (2022.01)
*G01P 3/38* (2006.01)
*G02B 13/22* (2006.01)

(52) U.S. Cl.
CPC ........... *G06V 10/751* (2022.01); *H04N 23/56* (2023.01); *G06T 2207/30108* (2013.01)

(56) References Cited

FOREIGN PATENT DOCUMENTS

| | | |
|---|---|---|
| JP | 3240175 B2 | 12/2001 |
| JP | 2002-372408 A | 12/2002 |
| JP | 2009-068957 A | 4/2009 |

* cited by examiner

DISPLACEMENT METER, STORAGE MEDIUM, MANUFACTURING SYSTEM, AND METHOD FOR MANUFACTURING ARTICLES

BACKGROUND OF THE INVENTION

Field of the Invention

The present invention relates to a displacement meter for measuring the displacement of an object to be measured, a storage medium, a manufacturing system, and a method for manufacturing articles.

Description of the Related Art

Conventional displacement meters include the displacement meter that is disclosed in Japanese Examined Patent Publication No. S59-52963. In this displacement meter, an object to be measured is irradiated with a laser to generate speckles and the displacement is measured based on the position of the extreme values of the correlation function between the signals obtained by photoelectrically converting the distribution of the respective speckle before and after the displacement. Additionally, Japanese Patent Application Laid-Open Publication No. H03-235007 discloses a method for improving the resolution based on information about the positions of the extreme values of the correlation function and the positions around thereof. Additionally, Japanese Patent No. 3240175 discloses a configuration in which, with respect to the signals that can be continuously obtained, a signal serving as the reference for a displacement measurement is switched according to the value of the extreme values of the correlation function.

Since the displacement meter disclosed in Japanese Examined Patent Publication No. S59-52963 performs displacement measurement based on the position of the extreme values of the correlation function, the resolution of the displacement measurement is determined by a resolution that is determined by the pixel size of the semiconductor image sensor to be used and the magnification of the optical system. To improve the resolution, using a sensor having a small pixel size or an optical system having a high magnification is necessary. However, in terms of the pixel size, the commonly available elements are limited, and increasing the magnification of the optical system makes it difficult to respond to the quick movement of the object to be measured.

Japanese Patent Application Laid-Open Publication No. H03-235007 discloses that measurement resolution is improved by using the data of the extreme values of the correlation function and the values before and after the extreme values as the signal processing method for the displacement meter. This resolution improving method is a method that is known as sub-pixel estimation. However, this method presents the problem that when the displacement amount is one pixel or less, errors that occur during the sub-pixel estimation cannot be ignored. The errors that occur during the sub-pixel estimation are periodic errors that will become zero when the displacement amount matches the half-integer pixel. For example, in the case of measuring an object to be measured that is moving at a substantially constant speed, if the displacement amount between each sampling is 0.2 pixels, errors that occur during the sub-pixel estimation will continue to accumulate, resulting in the occurrence of a large displacement measurement error.

In contrast, Japanese Patent No. 3240175 discloses a displacement meter in which, with respect to the continuously obtained signals, the signal serving as the reference for the displacement measurement is switched according to the value of the extreme values of the correlation function, and a stable measurement is achieved. However, it is impossible to eliminate the above-described errors that occur during the sub-pixel estimation. One object of the present invention is to provide a displacement meter capable of suppressing errors that occur during sub-pixel estimation.

SUMMARY OF THE INVENTION

According to one aspect of the present invention, a displacement meter comprises: a light source configured to illuminate an object to be measured; an image pickup unit configured to receive diffuse-reflected light generated on a surface of the object to be measured that has been illuminated by the light source, and to output an image; and at least one processor or circuit configured to function as a calculation unit configured to calculate the displacement of the object to be measured, wherein the calculation unit calculates a displacement amount of the object to be measured by using sub-pixel estimation and using the cross-correlation function between reference image data and measurement image data, in which an image acquired during a predetermined timing from the imaging unit serves as the reference image data and an image acquired during the next timing serves as the measurement image data, generates a value that is obtained by subtracting a correction value from the displacement amount to serve as a correction displacement amount, sets the most recent measurement image data as the reference image data and sets a predetermined initial value as the correction value in a case where the displacement amount meets a predetermined condition, and sets the displacement amount obtained most recently as the correction value in a case where the displacement amount does not meet the predetermined condition.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate descriptions will be omitted or simplified.

First Embodiment

Figure 1:
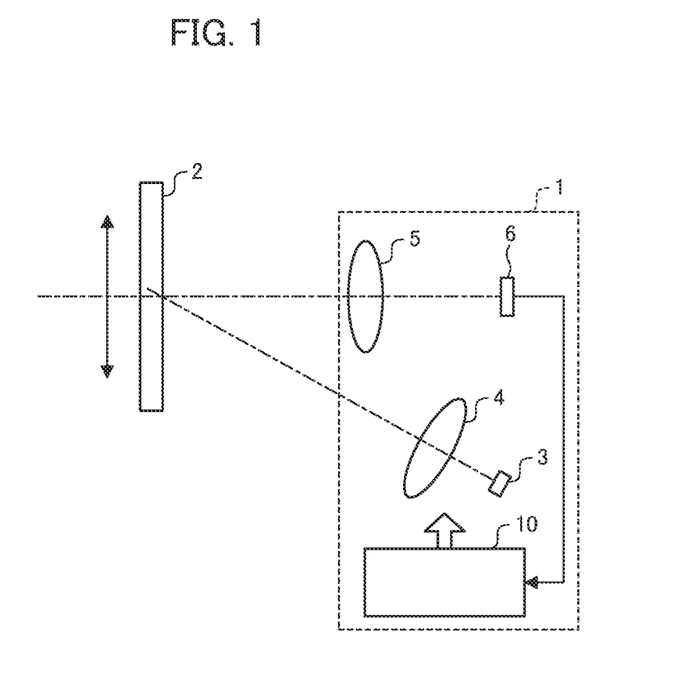
FIG. 1 is a block diagram illustrating a configuration of a displacement meter according to the first embodiment.

FIG. 1 illustrates a block diagram of a displacement meter according to the first embodiment. As shown in FIG. 1, a displacement meter 1 of the present embodiment measures, in a non-contact manner, the displacement of a measuring object 2 that is located so as to face the displacement meter 1 and is moving in the direction of the arrow in the drawing. A light flux that has been emitted from a light source 3 is collected on the measurement object 2 by a light collecting member 4 and illuminates the measuring object 2. The light source 3 can be selected appropriately from among a laser diode, an LED, a halogen lamp, and the like.

The image obtained when a laser diode is selected is an image configured by speckles, and when an LED or a halogen lamp is selected, an image is obtained that reflects the pattern of the surface of the measuring object 2. The light collecting member 4 is configured by a single lens or a lens group. When a laser diode is used, it is preferable that aberration correction is performed so that light can be collected by a plane wave.

When an LED or a halogen lamp is selected, it is sufficient to illuminate the light receiving area, and there are no particular problems such as aberration or the like. The light source 3 can be selected appropriately according to the size of the area to be illuminated. The diffuse-reflected light generated on the surface of the measuring object 2 is received by a sensor 6 that serves as an image pickup unit through a light receiving optical system configured by a light collecting member 5, and an image is output from the sensor 6. The light collecting member 5 is configured by a single lens or a lens group. It can be selected appropriately according to the resolution of the light receiving optical system. The sensor 6 is configured by an image pickup element, for example, by an array of photoelectric conversion elements such as a CCD element and a CMOS element.

The magnification of the light receiving optical system can be determined based on the installation distance between the measuring object 2 and the light-collecting member 5, the focus distance of the single lens or the lens group used in the light collecting member 5, and the installation distance of the sensor 6. The conversion length of the pixel serving as the measurement reference, in other words, the resolution, is determined based on the magnification of the light receiving optical system and the size of the pixels that configure the sensor 6. The light flux imaged on the sensor 6 is photoelectrically converted and then output to a signal processing unit 10. The signal processing unit 10 is configured by an FPGA, a microcomputer, or the like, and functions as a calculation unit that calculates a displacement amount based on an image, which is an output of the sensor 6. The signal processing unit 10 also functions as a control means that controls the operations of each unit of the entire displacement meter based on a computer program stored in the memory.

Figure 2:
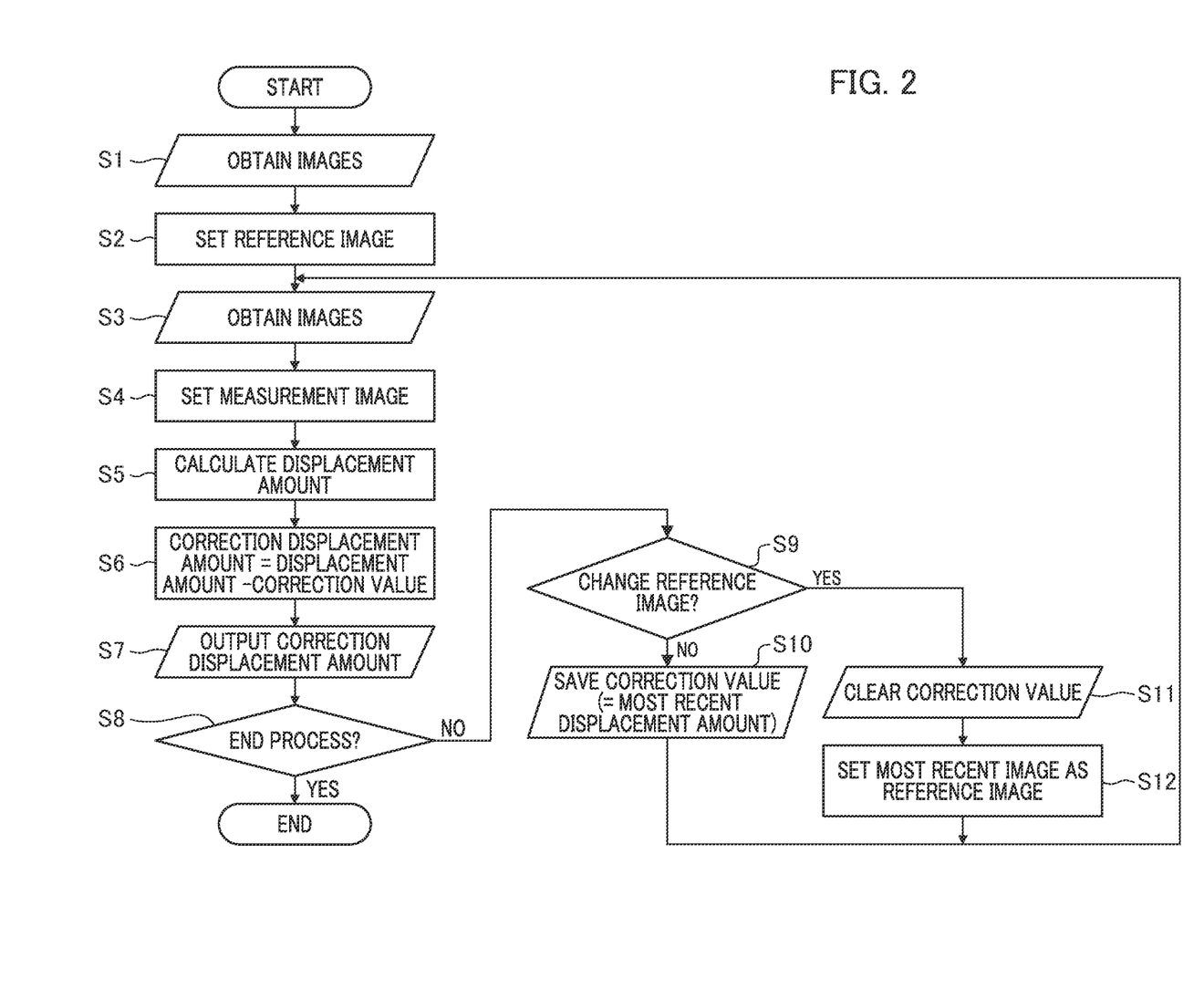
FIG. 2 is a flowchart showing a signal processing method of the displacement meter according to the first embodiment.

FIG. 2 is a flowchart showing the signal processing method of the displacement meter of the first embodiment. The operations of each step in the flowchart in FIG. 2 are performed by the computer in the signal processing unit 10 executing the computer program stored in the memory 2. With the start of measurement, in step S1, the displacement meter 1 sequentially obtains images at a predetermined sampling rate by using the sensor 6.

In step S2, the image obtained first is set as the reference image data, in step S3, images are further obtained, and in step S4, the images that are sequentially obtained are set as the measurement image data. In step S5, the displacement amounts are sequentially calculated. In the displacement amount calculation in step S5, the cross-correlation function between the reference image data and the measurement image data is calculated, and the displacement is determined based on the positions of the extreme values. Note that, in addition to the cross-correlation function, the sum of squared difference (SSD) or the sum of absolute difference (SAD) between the two images may be used.

While the extreme values of the cross-correlation function are determined on a pixel-by-pixel basis, the calculation is made with a resolution equal to or lower than the size equivalent to one pixel, and sub-pixel estimation is thereby performed. In sub-pixel estimation, the extreme values of the cross-correlation function and the values before and after the extreme values are used to perform approximation as a quadratic function, and the extreme values of the approximation function are provided as the displacement. Other approximation methods, for example, approximation as an intersection point of a straight line, or approximation using a Gaussian distribution may be used instead of approximation as a quadratic function.

Figure 3:
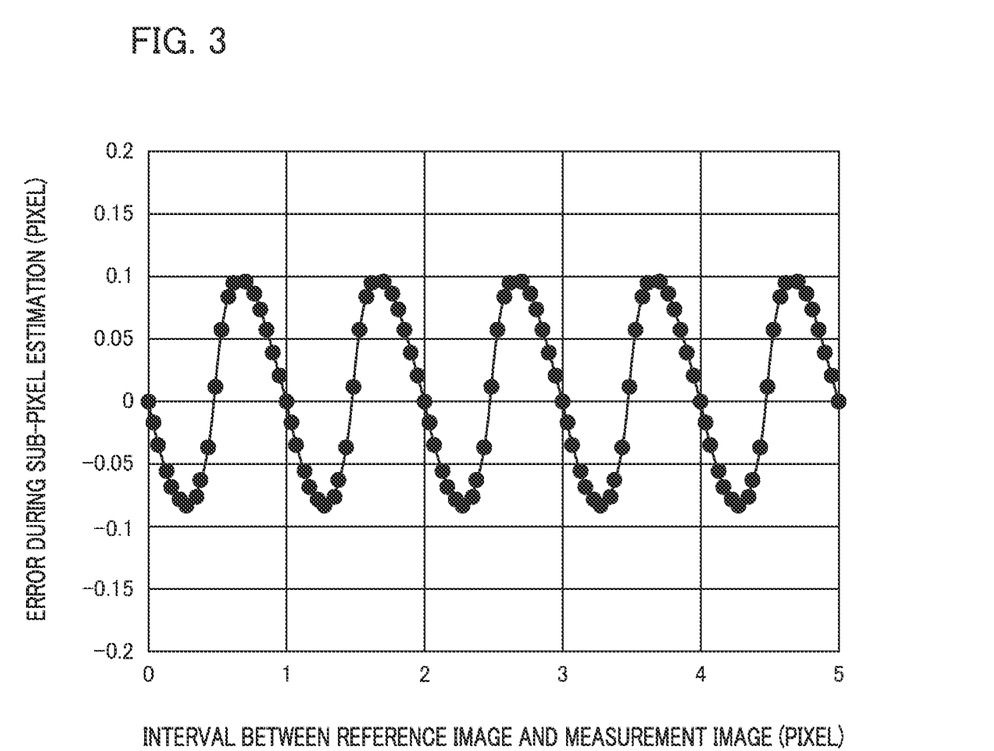
FIG. 3 illustrates an error occurring during sub-pixel estimation.

When sub-pixel estimation is performed, an error having a periodic magnitude occurs according to the distance between the point where the reference image data have been acquired and the point where the measurement image data have been acquired. FIG. 3 illustrates errors that occur during sub-pixel estimation. In the drawing, length measurement errors of the sequentially obtained images are shown in which the images of the object to be measured that have been sequentially displaced are obtained at intervals corresponding to 0.05-pixel pitches for each sampling, and the image acquired first serves as the reference image data. At the timing when the displacement amount is (integer/2) times of the pixel pitch, the error becomes almost zero, and errors occur periodically before and after the timing. Although the magnitude of this error depends on the composition of the spatial frequency components included in the image, the cycle matches the conversion length of the pixel.

Figure 4A:
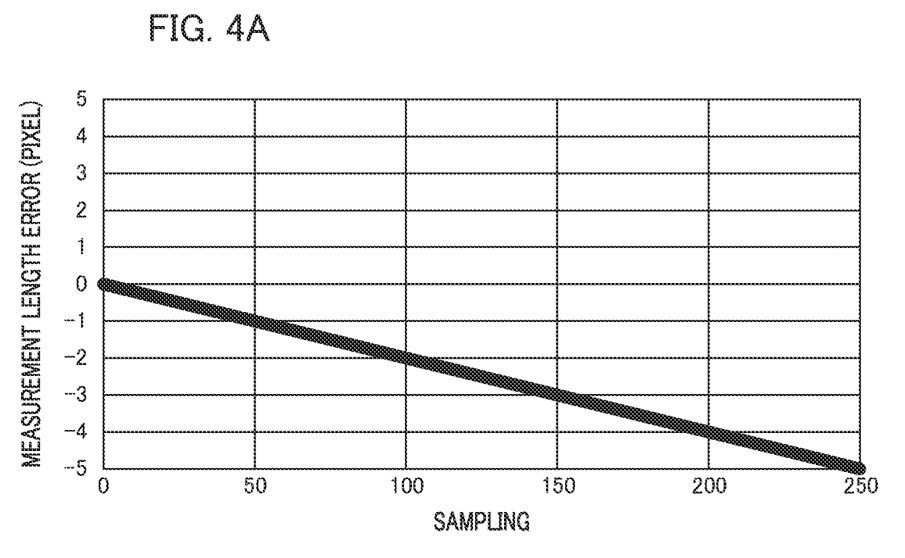
FIGS. 4A and 4B illustrate how a length measurement error occurs due to the handling of the reference image data.
Figure 4B:
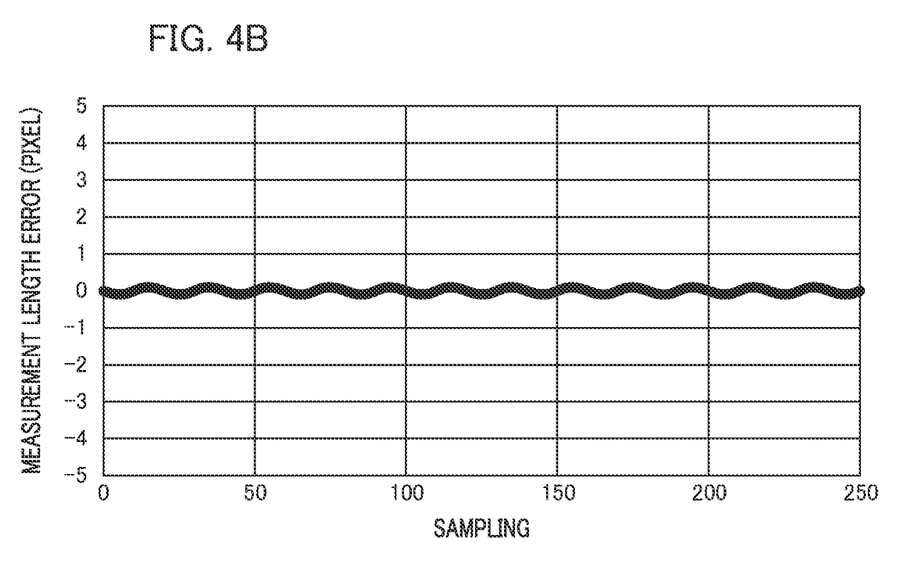

FIG. 4 illustrates how a length measurement error occurs due to how the reference image data is handled. It is assumed that the reference image is handled using a method in which the reference image data is updated every time for each sampling. Specifically, the image obtained during the first sampling is set as the reference image data, the image obtained during the second sampling serves as the measurement image data, and the displacement is calculated. Subsequently, the image obtained during the second sampling is reset as the reference image data, the image obtained during the third sampling serves as the measurement image data, and the displacement is calculated. If a measurement has an error that has occurred during the sub-pixel estimation as shown in FIG. 3, the errors that occur during the first displacement calculation accumulate with each calculation.

FIG. 4A illustrates length measurement errors that occur when the reference image data are updated each time. It can be seen from FIG. 4A that the errors that occur during the sub-pixel estimation accumulate. In contrast, a method can also be conceived that does not change the reference image data. Specifically, the image obtained during the first sampling is set as the reference image data, the image obtained during the second sampling serves as the measurement image data, and the displacement is calculated. Subsequently, the image obtained during the third sampling is set as the measurement image data while the image obtained during the first sampling remains as the reference image data, and the displacement is calculated.

FIG. 4B illustrates length measurement errors that occur when the reference image data are maintained. In this case, although periodic errors occur as in the graph shown in FIG. 3, the errors do not accumulate endlessly. However, since the obtained images also change with the movement of the measuring object 2, the correlation between the reference image data and the measurement image data are lost.

Figure 5A:
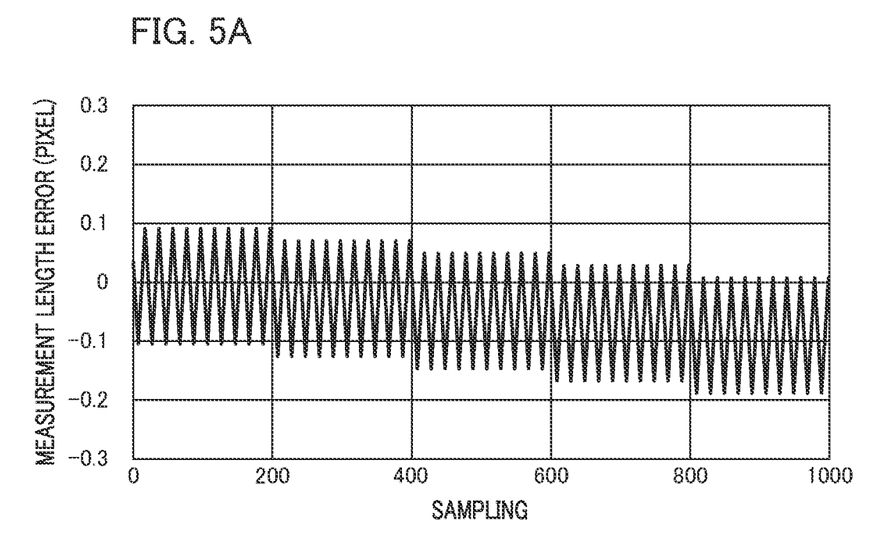
FIGS. 5A and 5B illustrate examples of the length measurement error when the reference image data are changed.
Figure 5B:
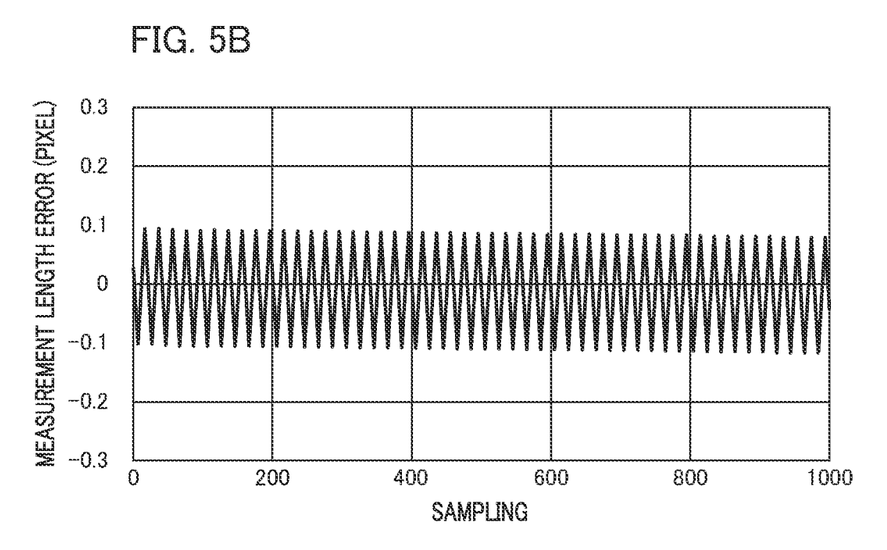

FIG. 5 illustrates an example of the length measurement errors when the reference image data are changed. FIG. 5A illustrates the length measurement errors when the displacement amount is set as a threshold and the reference image data are changed every time the displacement amount exceeds 10 pixels as the condition for changing the reference image data. Here, for one pixel, the cycle of the errors that occur during sub-pixel estimation corresponds to one cycle, and in FIG. 5A, the reference image data are changed at a timing that has exceeded 10 cycles. When the displacement amount exceeds 10 pixels during the N-th sampling, the image obtained during the N-th sampling is reset as the reference image data, and the image obtained during the N+1 sampling is set as the measurement image data, and displacement calculation is performed.

Although, the error that occurs during the sub-pixel estimation becomes approximately zero when the displacement of the object to be measured matches the integer pixel, in this example, this error has been measured slightly too short. In the case in which such a length measurement error occurs, if the threshold is set as an integer multiple of the pixel pitch, the reference image data are changed during the next sampling, during which the error is smallest. Hence, the length measurement errors accumulate for every 10 pixels of displacement, as shown in FIG. 5A. That is, when the threshold is set to an integer multiple of the pixel pitch as described above, there is the problem that the errors that occur during the sub-pixel estimation accumulate.

If the length measurement error amount "x" that occurs during the sub-pixel estimation and the desired length measurement error "a" are clearly defined, the number of pixels that serves as the threshold can be set as a value that is equal to or greater than x/a. Specifically, if the number of errors that occur during the sub-pixel estimation is x[pixel] and the upper limit of measurement error is a [%], it is desirable that the reference image data are changed such that, with respect to the displacement amount, x/(a/100) is the lower limit and a value larger than the lower limit serves as the threshold. In that case, when the displacement amount is larger than the above threshold, the reference image data are changed. It is desirable that the threshold is set such that, with respect to the displacement amount, the upper limit of the number of pixels is ½ of the number of pixels of the image pickup unit.

FIG. 5B illustrates the length measurement errors when, as the reference image data change condition, the difference in the displacement acquired during the sub-pixel estimation from an integer multiple of the pixel pitch is 1% or less for one pixel. In this case, the reference image data are changed during the timing when the above-described length measurement error is the lowest, and the accumulation of errors can be minimized. Here, although an example of 1% is given as the threshold for the determination, the value of the threshold can be appropriately determined based on the desired length measurement accuracy.

Thus, if a deviation amount of the displacement amount acquired during the sub-pixel estimation from the integer multiple of the pixel pitch is lower than a predetermined threshold, the reference image data may be changed, and it is further preferable that the predetermined threshold is set to 1% of the pixel pitch. Note that the quality of the obtained image may deteriorate due to the surface condition of the measuring object 2 or the measurement environment, and the errors that occur during the sub-pixel estimation may thereby increase.

In that case, only providing the above-predetermined threshold for the difference of the displacement acquired during the sub-pixel estimation from an integer multiple of the pixel pitch (first condition) as described above may not meet the condition for changing the reference image data due to the influence of errors. That is, if the displacement of the measuring object 2 increases without changing the reference image data, the correlation will decrease as described above, and the measurement may be disabled.

In order to avoid such a problem, a threshold is provided for the difference of the displacement amount acquired during the sub-pixel estimation from an integer multiple of the pixel pitch, and a condition in which the displacement amount is lower than the threshold is set as a first condition. Further, as a second condition, a condition in which the displacement amount is larger than a predetermined threshold (second threshold) is set, and if a combination of the two conditions in which either the first condition or the second condition is met is used, the reference image data can be changed more reliably. That is, it is desirable that the logical sum of the first condition and the second condition is included in the conditions for changing the reference image data. It is desirable that a user can manually change the threshold. Alternatively, the optimum threshold may automatically be set by performing a predetermined calibration.

In view of the above, the description will return to the flowchart in FIG. 2. In step S2, the image obtained during the first sampling point is set as the reference image data, and in step S4, the image obtained during the second sampling point is set as the measurement image data. Subsequently, in step S5, the displacement amount calculation is performed. The displacement amount calculation is performed by calculating the cross-correlation function between the reference image data and the measurement image data and performing a sub-pixel estimation based on the extreme values and the values before and after the extreme values.

In step S6, the value obtained by subtracting a predetermined correction value from the displacement amount acquired in step S5 is generated as a correction displacement amount. The initial value of the correction value is set to zero. Accordingly, the correction displacement amount for the first time completely matches the displacement amount. In step S7, the calculated correction displacement amount is output. In step S8, whether or not to end the process is determined, and when the result is "Yes", the flow ends. In contrast, when the result is "No", the process proceeds to step S9.

In step S9, whether or not to change the reference image data is determined based on the reference image data change condition. That is, when the displacement amount meets the predetermined condition, the reference image data are changed. In this example, as the reference image data change condition, the case in which the threshold is determined for the displacement amount will be described.

When the displacement amount is equal to or lower than the threshold ("No" in step S9), that is, when the displacement amount does not meet the predetermined condition, the process proceeds to step S10. In step S10, the reference image data are not changed, and the calculated displacement amount (most recent displacement amount) is saved as the correction value. That is, the displacement amount obtained during the last calculation is set as the correction value. After the correction value is saved, the process proceeds to step S3, where the image obtained during the third sampling is set as the measurement image data and the displacement calculation is performed. The correction displacement amount is calculated by subtracting the correction value from the obtained displacement amount. In this case, the displacement amount and the correction displacement amount do not match.

In contrast, in step S9, if the displacement amount is larger than the threshold, in step S11, the correction value is cleared and set as the initial value (for example, zero). Additionally, in step S12, the reference image data are changed, and the image obtained during the second sampling (the most recent image) is set as the reference image data. Specifically, when the above displacement amount meets the predetermined condition, the measurement image data that have been set during the last calculation are set as the reference image data and a predetermined initial value is set as the correction value.

Subsequently, the description will return to step S3, and in step S4, the image obtained during the third sampling is set as the measurement image data, and in step S5, the displacement amount calculation is performed. In step S6, the correction value is subtracted from the acquired displacement amount to calculate the correction displacement amount. In this case, the displacement amount and the correction displacement amount match again.

Subsequently, the same procedure is repeated. The same applies to the case in which, as the reference image data change condition, the difference of the displacement that has been acquired in sub-pixel estimation from the integer pixel serves as a threshold and the displacement amount is lower than the threshold. Alternatively, as described above, the determination in step S9 may be performed based on the logical sum of the first condition and the second condition. As described above, it is desirable that the threshold in step S9 can be changed automatically or manually by the user. If the threshold is changed automatically, the optimal threshold is automatically set, for example, by performing a predetermined calibration.

Thus, according to the present embodiment, a threshold for meeting a predetermined condition is set in accordance with the amounts of errors that occurs during sub-pixel estimation. According to the process of the flowchart in FIG. 2, the output correction displacement amount means the displacement information between each sampling, and is an amount corresponding to a speed. The total length measurement value can be acquired by addition/accumulation by a upper-level control system.

Second Embodiment

Figure 6:
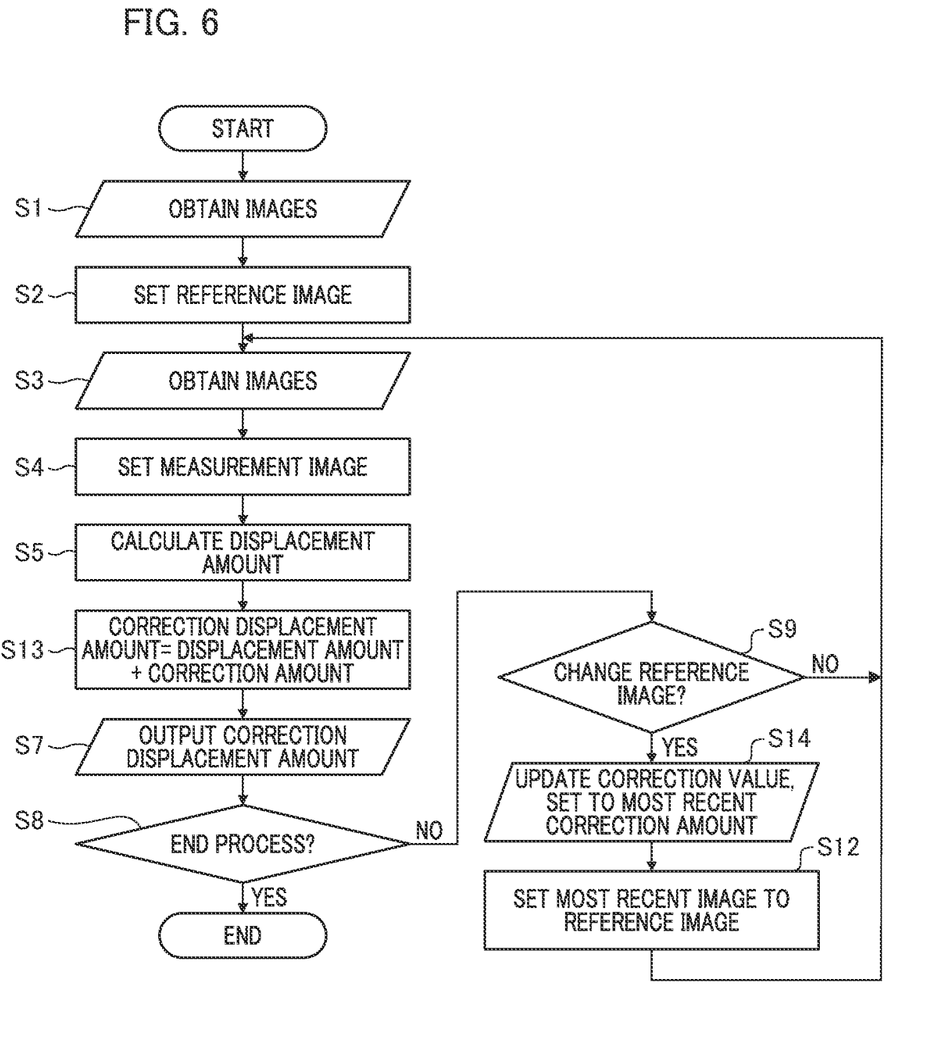
FIG. 6 is a flowchart showing the signal processing method of the displacement meter according to the second embodiment.

FIG. 6 is a flowchart showing the signal processing method of the displacement meter in the second embodiment. The operations for each step in the flowchart in FIG. 6 are performed by the computer in the signal processing unit 10 executing the computer program stored in the memory 2. Steps with the same number as those in FIG. 2 are the same operations, and descriptions thereof will be omitted. Steps S1 to S5 are the same as the flow in FIG. 2 in the first embodiment.

In steps S1 to S5, the image obtained during the first sampling time point is set as o the reference image data, the image obtained during the second sampling time point is set as the measurement image data, the displacement amount calculation is performed, and subsequently the process proceeds to step S13. In step S13, a value obtained by adding the correction value to the displacement amount is generated as a correction displacement amount. The initial value of the correction value is set to, for example, zero. The correction displacement amount from the first time matches the displacement amount. In step S7, the correction displacement amount obtained in step S13 is output.

Next, in step S8, whether or not to end the process is determined, and if the result is "No", the process proceeds to step S9, where whether or not to change the reference image data using the reference image data change condition is determined. A description will now be given of a case in which a threshold is determined for a displacement amount to serve as the reference image data changing condition. If the displacement amount is equal to or lower than the threshold, the reference image data are not changed and the process proceeds to step S3. That is, when the displacement amount does not meet the predetermined condition, the reference image data and the correction value are not changed. The image obtained from the third sampling time point is set as the measurement image data, and the displacement amount calculation is performed. The correction displacement amount is calculated by adding the correction value to the obtained displacement amount. In this case, the displacement amount and the correction displacement amount match again.

In contrast, in step S9, if the displacement amount is larger than the threshold, in step S14, the calculated displacement amount is saved as the correction amount, and in step S12, the reference image data are changed. That is, in step S12, the image obtained from the second sampling time point (the most recent image) is set as the reference image data.

Thus, in the present embodiment, when the displacement amount meets a predetermined condition, the measurement image data set during the last calculation are set as the reference image data, and the displacement amount obtained during the last calculation is set as a correction value. Subsequently, the process proceeds to step S3. In step S4, the image obtained during the third sampling is set as the measurement image data, and in step S5, displacement amount calculation is performed. In step S13, the correction value is added to the displacement amount acquired in step S5 and the correction displacement amount is calculated. In this case, the displacement amount and the correction displacement amount do not match.

Subsequently, the same procedure is repeated. The same applies to the case in which, as the reference image data change condition in step S9, the difference in the displacement acquired during the sub-pixel estimation from the integer pixel serves as the threshold and the displacement amount is lower than the threshold. Alternatively, as described above, in step S9, the logical sum of the first condition and the second condition may be used as the determination condition. In the flowchart of FIG. 6, the correction displacement amount output in step S7 indicates an accumulated displacement amount of the measuring object 2 from the start of the measurement.

Third Embodiment

Figure 7:
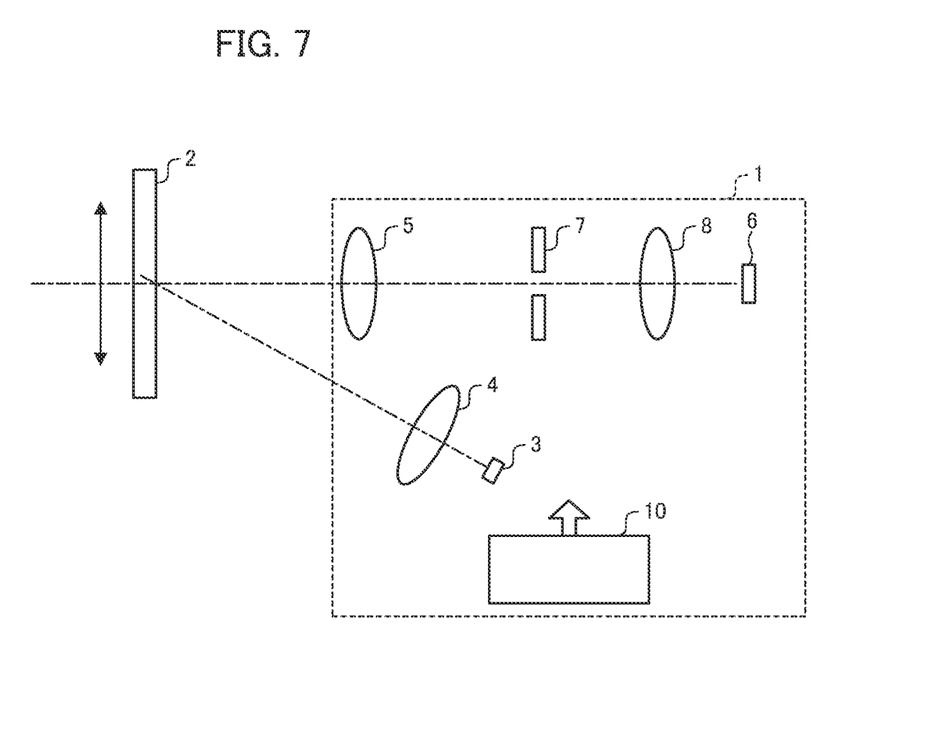
FIG. 7 is a block diagram illustrating a configuration of the displacement meter according to the third embodiment.

FIG. 7 illustrates a configuration of the displacement meter of the third embodiment, and the same reference numerals as those in FIG. 1 indicate the same configuration, and descriptions thereof will be omitted. A light flux emitted from a light source 3 is collected on a measurement object 2 by the light collecting member 4 to illuminate the measurement object 2, and a part of the light flux that is diffused and reflected by the measuring object 2 is collected on the sensor 6 through a light receiving optical system configured by a first lens group 15, an aperture stop 7, and a second lens group 8. Here, it is desirable that the aperture stop 7 is arranged so as to be aligned with the focus positions of the first lens group 15 and the second lens group 8 to configure a double telecentric optical system. The first lens group 15 and the second lens group 8 may each be configured by a single lens, or a combination lens, for example, an achromatic lens may be used to suppress chromatic aberration and spherical aberration.

The measuring object 2 may vibrate in the direction of the optical axis of the light receiving optical system, in addition to the direction of the arrow shown in the drawing. Additionally, there is a case in which the user desires to measure measurement objects having multiple kinds of thicknesses, which serve as the measurement object 2. Further, the installation locations of the light receiving optical system and the sensor 6 may change due to manufacturing errors, the influence of temperature, and the like. Thus, the changes in the position of the measuring object 2 and the sensor 6 cause a variation in the magnification in a normal imaging optical system, and the measurement reference becomes unstable.

It is possible to suppress the influence of this variation by configuring the light receiving optical system with a double telecentric optical system. Even in the case in which a double telecentric optical system is adopted to suppress the magnification variation, when the position of the object to be measured changes, blurring occurs in the obtained image, and the amount of error that occurs during the sub-pixel estimation is thereby affected. However, adopting the flow shown in FIG. 2 or FIG. 6 makes it possible to measure the displacement with high accuracy even if the position of the measuring object 2 changes.

In the configuration of the displacement meter 1, if the positional deviation of the sensor 6 is guaranteed to be sufficiently low, just the object side may be configured by a telecentric optical system, instead of using the second lens group 8. Alternatively, if the vibration, variation, or the like of the measuring object 2 is sufficiently low, the displacement meter 1 does not need to be configured by a telecentric optical system. When a double telecentric optical system such as the one shown in FIG. 7 is adopted, the magnification of the light receiving optical system can be determined based on the ratio of the focus lengths of the first lens group 15 and the second lens group 8. Additionally, it is possible to determine the conversion length of the pixel serving as the measurement reference based on the magnification of the light receiving optical system and the size of the pixel configuring the sensor 6.

If a coherent light source, for example, a laser diode, is used as the light source 3, the obtained image is a speckle. The speckle deforms as the illumination region of the surface to be measured changes. In contrast, if incoherent light sources such as an LED and a halogen lamp are selected, the obtained image represents a normal surface pattern and is determined by the location of observation even if the illumination region changes. In the case in which the combination of an oblique incident illumination and the coherent light source shown in FIG. 7 is selected, if the change in the distance to the measuring object 2 is taken into consideration as described above, the speckle pattern changes even when the measuring object 2 does not move into the plane.

It is difficult to distinguish changes in the speckle pattern that are due to changes in the distance to the measuring object 2 and changes in the speckle pattern according to the in-plane displacement of the measuring object 2. Accordingly, the coherent light source is selected assuming the change in the distance to the measuring object 2, and it is preferable that a Coaxial episcopic optical system is selected. That is, it is preferable that illumination is performed via the light receiving optical axis by using a half mirror or the like, instead of oblique incident illumination. Further, when the coherent light source is selected and the speckle pattern is used, the curvature of the surface to be measured is also affected. For example, when a side surface of a rotating cylinder is measured as the measuring object 2, the change in the speckle pattern becomes an amount of change that reflects the curvature of the cylinder. The speckle pattern also changes depending on the distance between the displacement meter 1 and the measuring object 2.

Hence, when the measuring object 2 having a curved surface is measured by using the coherent light source, correction to the displacement amount that has been calculated based on the curvature of the measuring object 2 and the information about the distance between the displacement meter 1 and the measuring object 2 is required. In contrast, an error that occurs when the incoherent light source is adopted as the light source is a difference between the length of the image pickup region when the surface of the object to be measured is regarded as a flat surface and the length of the circumferential portion corresponding to the curvature of the surface in the image pickup region.

This error is fixed even when the distance to the measuring object 2 changes, and can be avoided by correcting the absolute value. Additionally, if the curvature is sufficiently high in relation to the image pickup region, this error is negligible. For example, an error of about 0.01% occurs when the image pickup region is 5 mm wide and the curved surface is R 100 mm. Accordingly, when the measuring object 2 is a curved surface, it is preferable that an incoherent light source is used.

Second Embodiment

Figure 8:
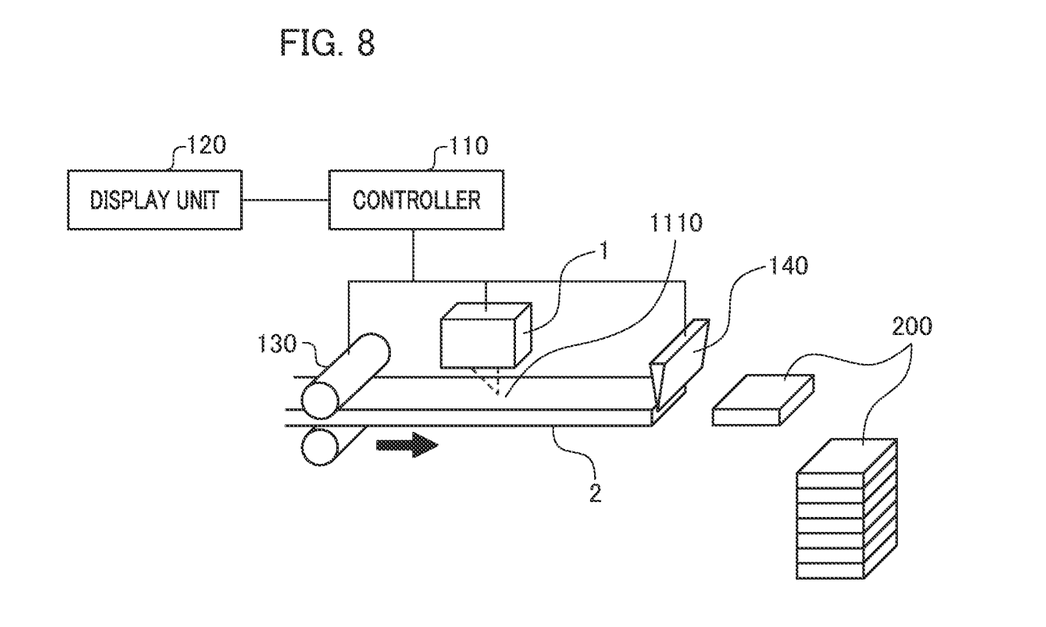
FIG. 8 is a configuration example of a manufacturing system according to the second embodiment.

FIG. 8 illustrates an example of the configuration of the manufacturing system of the second embodiment. The displacement meter 1 is used by being installed in, for example, a cutting device serving as a processing device, and functions as a part of the cutting device. In the cutting device, a material (the measuring object 2) is conveyed by a conveying unit 130, the conveyance stops at a stage when a predetermined length of the material is conveyed, and the material is cut by a cutting section 140 serving as a processing unit. Products 200 that are cut at a predetermined length become articles, which are outputs of the cutting device. In the present embodiment, although the cutting processing is performed by the cutting section, the present invention is not limited to cutting processing, and processing such as bending, cutting to form holes or cutouts, or the like may be performed.

The displacement meter 1 illuminates the measuring object 2 using a light source (not illustrated) and obtains an image of a measurement area 1110. The displacement meter 1 performs control, for example, such as that shown in the flowchart in FIG. 2, based on the obtained image, calculates a correction displacement amount for the measuring object 2, and outputs the calculated correction displacement amount to a controller 110. The controller 110 sends a drive command to the conveying unit 130 based on the correction displacement amount of the measuring object 2 that has been obtained from the displacement meter 1 to control the conveying unit 130.

Thus, the manufacturing system of the present embodiment has a step of calculating a displacement amount or a speed of the measuring object 2 by using the displacement meter 1, and a step of manufacturing an article by, for example, cutting, bending, or machining the measuring object 2 based on the displacement amount or the speed. Accordingly, it is possible to measure the length of the actual movement of the measuring object 2 with high accuracy and it is possible to manufacture products 200 with a lower variation in length. The lower variation in length of the products 200 makes it possible to reduce, for example, the step of inspecting the length, which is a post-step, and the reliability of other devices, such as automobiles, into which the product 200 is incorporated, can thereby be improved.

The controller 110 has a storage device, for example, a memory storing a computer program for controlling calculation devices such as a CPU serving as a computer, the conveying unit 130, the measuring object 2, and the cutting section 140. Note that, the controller 110 for controlling the conveying unit 130 and the cutting section 140 may be provided outside of the manufacturing system in FIG. 8. Additionally, the measurement data measured by the displacement meter 1 and the obtained image may be displayed on a display unit 120.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. In addition, as a part or the whole of the control according to this embodiment, a computer program realizing the function of the embodiment described above may be supplied to the displacement meter through a network or various storage media. Then, a computer (or a CPU, an MPU, or the like) of the displacement meter may be configured to read and execute the program. In such a case, the program and the storage medium storing the program configure the present invention.

This application claims the benefit of Japanese Patent Application No. 2021-074766 filed on Apr. 27, 2021, which is hereby incorporated by reference herein in its entirety.

What is claimed is:

1. A displacement meter comprising:
an incoherent light source configured to illuminate an object to be measured;
a double telecentric optical system configured to receive diffused-reflected light generated on a surface of the object that has been illuminated by the incoherent light source;
an image pickup unit configured to receive diffused-reflected light through the double telecentric optical system to output an image; and
at least one processor or circuit configured to function as:
a calculation unit configured to calculate the displacement of the object to be measured,
wherein the calculation unit calculates a displacement amount of the object to be measured by using sub-pixel estimation and using a cross-correlation function between reference image data and measurement image data, in which an image acquired during a predetermined timing from an imaging unit serves as the reference image data and an image acquired after the predetermined timing serves as the measurement image data,
generates a value obtained by subtracting a correction value from the displacement amount to serve as a correction displacement amount,
sets the most recent measurement image data as the reference image data and sets a predetermined initial value as the correction value in a case where the displacement amount meets a predetermined condition, and
sets the displacement amount obtained most recently as the correction value in a case where the displacement amount does not meet the predetermined condition.

2. The displacement meter according to claim 1, wherein a predetermined threshold for meeting the predetermined condition is set according to an amount of error that occurs in the sub-pixel estimation.

3. The displacement meter according to claim 2, wherein in a case where an amount of error that occurs in the sub-pixel estimation is x[pixel] and an upper limit of measurement error is a [%], the predetermined threshold for meeting the predetermined condition is set such that, for the displacement amount, x/(a/100) is a lower limit and, for the displacement amount, ½ of the number of pixels of the image pickup unit is an upper limit.

4. The displacement meter according to claim 2, wherein the predetermined condition includes, as a first condition, that a deviation amount of the displacement amount acquired in the sub-pixel estimation from an integer multiple of a pixel pitch of the image pickup unit is lower than the predetermined threshold.

5. The displacement meter according to claim 4, wherein the predetermined threshold is 1% of the pixel pitch.

6. The displacement meter according to claim 4, wherein the predetermined condition includes a logical sum of the first condition and a second condition, wherein the second condition is that the displacement amount is larger than a predetermined second threshold.

7. The displacement meter according to claim 1, wherein the predetermined condition includes, as a second condition, that the displacement amount is larger than a predetermined second threshold.

8. A manufacturing system comprising:
a displacement meter according to claim 1; and
a processing unit configured to process an object to be measured based on a correction displacement amount of the object to be measured, which has been obtained by the displacement meter.

9. A displacement meter comprising:
an incoherent light source configured to illuminate an object to be measured;
a double telecentric optical system configured to receive diffused-reflected light generated on a surface of the object that has been illuminated by the incoherent light source;
an image pickup unit configured to receive diffused-reflected light through the double telecentric optical system to output an image; and
at least one processor or circuit configured to function as:
a calculation unit configured to calculate the displacement of the object to be measured,
wherein the calculation unit calculates a displacement amount of the object to be measured by using sub-pixel estimation and using a cross-correlation function between reference image data and measurement image data, in which an image acquired during a predetermined timing from an imaging unit serves as the reference image data and an image acquired after the predetermined timing serves as the measurement image data, generates a value obtained by adding a correction value to the displacement amount to serve as a correction displacement amount, sets the most recent measurement image data as the reference image data and sets the displacement amount obtained most recently as the correction value in a case where the displacement amount meets a predetermined condition, and does not change the reference image data and the correction value in a case where the displacement amount does not meet the predetermined condition.

10. A manufacturing system comprising:
a displacement meter according to claim 9; and
a processing unit configured to process an object to be measured based on a correction displacement amount of the object to be measured, which has been obtained by the displacement meter.

11. A non-transitory computer-readable storage medium configured to store a computer program to control a displacement meter, the displacement meter comprising:
an incoherent light source configured to illuminate an object to be measured;
a double telecentric optical system configured to receive diffused-reflected light generated on a surface of the object that has been illuminated by the incoherent light source;
an image pickup unit configured to receive diffused-reflected light through the double telecentric optical system to output an image; and
at least one processor or circuit configured to function as:
a calculation unit configured to calculate the displacement of the object to be measured,
wherein the computer program comprises instructions for causing the calculation unit to execute following processes:
calculating a displacement amount of the object to be measured by using sub-pixel estimation and using a cross-correlation function between reference image data and measurement image data, in which an image acquired during a predetermined timing from an imaging unit serves as the reference image data and an image acquired after the predetermined timing serves as the measurement image data;
generating a value obtained by subtracting a correction value from the displacement amount to serve as a correction displacement amount;
setting the most recent measurement image data as the reference image data and setting a predetermined initial value as the correction value in a case where the displacement amount meets a predetermined condition; and
setting the displacement amount obtained most recently as the correction value in a case where the displacement amount does not meet the predetermined condition.

12. An article manufacturing method using a displacement meter, the displacement meter comprising:
an incoherent light source configured to illuminate an object to be measured;
a double telecentric optical system configured to receive diffused-reflected light generated on a surface of the object that has been illuminated by the incoherent light source;
an image pickup unit configured to receive diffused-reflected light through the double telecentric optical system to output an image; and
a calculation unit configured to calculate the displacement of the object to be measured,
wherein the article manufacturing method comprises the steps of:
calculating a displacement amount of an object to be measured by using sub-pixel estimation and by using a cross-correlation function between reference image data and measurement image data, in which an image acquired during a predetermined timing from an imaging unit serves as the reference image data and an image acquired after the predetermined timing serves as the measurement image data,
generating a value obtained by subtracting a predetermined correction value from the displacement amount to serve as a correction displacement amount,
setting the most recent measurement image data as the reference image data and setting a predetermined initial value as the correction value in a case where the displacement amount meets a predetermined condition,
setting the displacement amount obtained most recently as the correction value in a case where the displacement amount does not meet the predetermined condition, and
calculating the displacement amount or a speed of the object to be measured by the calculation unit and
manufacturing an article by processing the object to be measured based on the displacement amount or the speed.

13. A non-transitory computer-readable storage medium configured to store a computer program to control a displacement meter, the displacement meter comprising:
an incoherent light source configured to illuminate an object to be measured;
a double telecentric optical system configured to receive diffused-reflected light generated on a surface of the object that has been illuminated by the incoherent light source;
an image pickup unit configured to receive diffused-reflected light through the double telecentric optical system to output an image; and
at least one processor or circuit configured to function as:
a calculation unit configured to calculate the displacement of the object to be measured,
wherein the computer program comprises instructions for causing the calculation unit to execute following processes:
calculating a displacement amount of the object to be measured by using sub-pixel estimation and using a cross-correlation function between reference image data and measurement image data, in which an image acquired during a predetermined timing from an imaging unit serves as the reference image data and an image acquired after the predetermined timing serves as the measurement image data,
generating a value obtained by adding a correction value to the displacement amount to serve as a correction displacement amount,
setting the most recent measurement image data as the reference image data and setting the displacement amount obtained most recently as the correction value in a case where the displacement amount meets a predetermined condition, and inhibiting changing the reference image data and the correction value in a case where the displacement amount does not meet the predetermined condition.

14. An article manufacturing method using a displacement meter, the displacement meter comprising:

an incoherent light source configured to illuminate an object to be measured;

a double telecentric optical system configured to receive diffused-reflected light generated on a surface of the object that has been illuminated by the incoherent light source;

an image pickup unit configured to receive diffused-reflected light through the double telecentric optical system to output an image; and wherein the article manufacturing method comprises the steps of:

calculating a displacement of the object to be measured by using sub-pixel estimation and using a cross-correlation function between reference image data and measurement image data, in which an image acquired during a predetermined timing from an imaging unit serves as the reference image data and an image acquired after the predetermined timing serves as the measurement image data, generating a value obtained by adding a correction value to the displacement amount to serve as a correction displacement amount, setting the most recent measurement image data as the reference image data and sets the displacement amount obtained most recently as the correction value in a case where the displacement amount meets a predetermined condition, inhibiting changing the reference image data and the correction value in a case where the displacement amount does not meet the predetermined condition; and manufacturing an article by processing the object to be measured based on the displacement amount or the speed.

* * * * *